FIG. 1

Dec. 19, 1967 E. SCHUH 3,358,802
COIN CONTROLLED PRINTER
Filed June 23, 1966 6 Sheets-Sheet 2

INVENTOR
Eduard Schuh
by
Michael J. Striker

FIG. 4

INVENTOR
Eduard Schuh

Dec. 19, 1967   E. SCHUH   3,358,802
COIN CONTROLLED PRINTER
Filed June 23, 1966   6 Sheets-Sheet 4

INVENTOR
Eduard Schuh by
Michael J. Striker
Atty.

Dec. 19, 1967 — E. SCHUH — 3,358,802
COIN CONTROLLED PRINTER
Filed June 23, 1966 — 6 Sheets-Sheet 5

FIG. 6

INVENTOR
Eduard Schuh
by Michael J. Striker

Dec. 19, 1967     E. SCHUH     3,358,802

COIN CONTROLLED PRINTER

Filed June 23, 1966     6 Sheets-Sheet 6

INVENTOR
Eduard Schuh
by Michael J. Striker
Atty

United States Patent Office 3,358,802
Patented Dec. 19, 1967

3,358,802
COIN CONTROLLED PRINTER
Eduard Schuh, Villingen, Black Forest, Germany, assignor to Kienzle Apparate G.m.b.H., Villingen, Black Forest, Germany
Filed June 23, 1966, Ser. No. 559,944
Claims priority, application Germany, June 25, 1965, K 56,474
12 Claims. (Cl. 194—10)

ABSTRACT OF THE DISCLOSURE

A coin operated fuel dispensing pump has printing means assuming upon insertion of coins a printing position for printing the total monetary value of the inserted coins on a blank which is discharged as a receipt to the customer inserting the coins.

---

The present invention relates to a coin controlled printer, and more particularly to a coin controlled printer which prints the total monetary value of coins inserted into a vending machine, such as a gasoline pump dispensing metered amounts of gasoline. It is desirable that coin controlled gasoline pumps automatically issue and print a receipt stating the amount of money received, and of course also the amount of gasoline sold.

It is one object of the invention to provide a coin controlled printer which prints the total monetary value of different coins inserted into the machine.

Another object of the invention is to control a printer by coins of different diameter to assume printing positions corresponding to the monetary value of the respective controlling coin.

Another object of the invention is to provide a coin controlled printer of simple construction which reliably operates under the control of different coins, or of the same type of coins.

Another object of the invention is to provide a coin controlled printer which senses the diameter of any inserted coin, and is automatically set to a printing position for printing the monetary value of a coin derived from its diameter.

With these objects in view, the present invention relates to a coil controlled printer which is particularly suitable for use with a gasoline pump at a gas station. One embodiment of the invention comprises printing means movable to successive printing positions representing monetary values; actuating means for operating the printing means; a coin holding device for receiving and holding different coins; a sensing device for sensing coins held by the coin holding device; means for causing sensing of a coin held in the coin holding device by the sensing device so that the same is moved to a sensing position representing the value of the sensed coin; and clearing means for clearing the printing means.

In accordance with the invention, the sensing device controls in the sensing positions the actuating means to move the printing means different numbers of steps representing the values of different sensed coins. Consequently, the printing means is set to a printing position representing the total value of coins successively sensed by the sensing device. The printer is then operated to print the total on a receipt, and to discharge the printed receipt.

In one embodiment of the invention, an inserted coin in the coin holding device is used for displacing a feeler member which stepwise turns the printing means through a pawl and ratchet device.

In another embodiment of the invention, different coins cause actuation of a switch for different numbers of times, and an electromagnetic means is controlled by the switch to stepwise turn the printing means, preferably by operating a pawl cooperating with a ratchet wheel connected with the printing means for turning movement.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
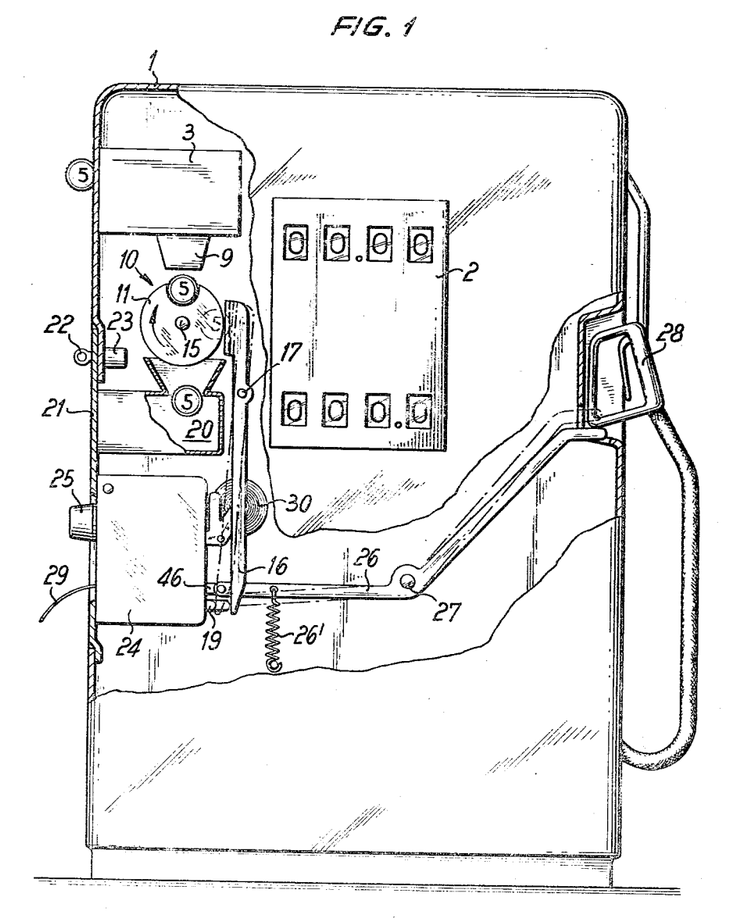
FIG. 1 is a front view, partially in section, illustrating a gas pump column provided with the printer of the invention.
Figure 3:
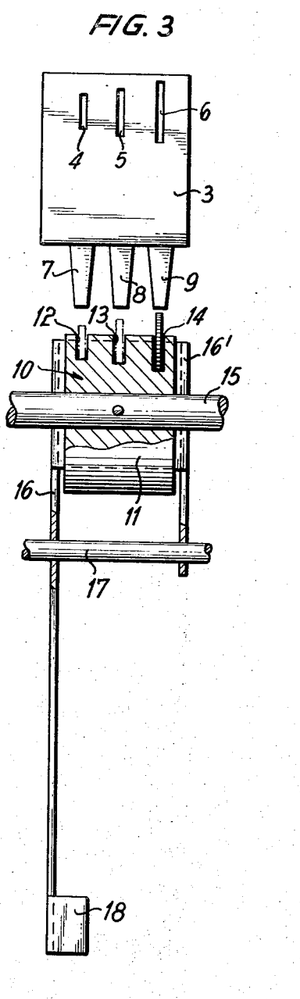
FIG. 3 is partly a fragmentary side elevation, and partly a sectional view along line III—III in FIG. 2.

Referring now to the drawing, and more particularly to FIG. 1 the housing 1 of the column of a gas pump at a gas station, envelopes a meter for measuring the amount of dispensed gasoline, and a gas pump and motor, not shown. A calculator is controlled by the meter to indicate the dispensed amount of gasoline in liters, and to calculate the price which is indicated in the upper part of calculator 2, for example in DM which is the German monetary unit. A coin testing device 3 has three slots 4, 5 and 6, as best seen in FIG. 3 into which coins of different diameter can be inserted, for example 1 DM, 2 DM and 5 DM. The testing device 3 eliminates in the usual manner improper coins, but permits good coins to move through chutes and guide means 7, 8 and 9 into semicircular recesses 12, 13 and 14 which are axially aligned and provided in the periphery of a coin holding drum 11. Coin holding drum 11 is secured to a shaft 15, and can be turned with the same by manual operation, or by a motor, not shown. Means, not shown, are provided which, upon insertion of the coin, start the pump motor and the meter and calculator in a manner which is not an object of the present invention.

Figure 2:
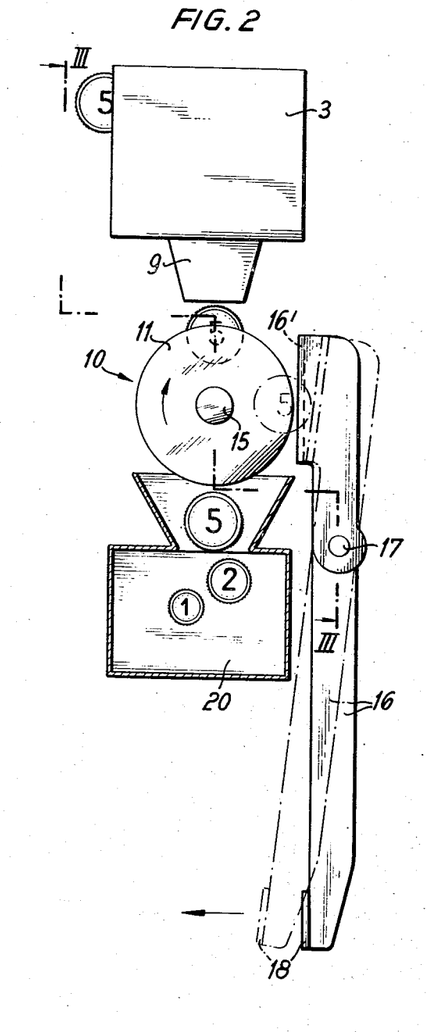
FIG. 2 is a fragmentary front view illustrating a coin receiving and sensing apparatus in accordance with one embodiment of the invention.

Sensing means are provided for recognizing the inserted coins, and in the embodiment of FIGS. 2 and 3, a feeler member has two arms mounted on a shaft 17 for angular movement, and a connecting plate 16' located opposite the coin holding drum 11. Feeler member 16 has a transverse engaging portion 18 which cooperates with an actuating member 19 for the printing apparatus, whose function will be explained hereinafter.

When the coin holding device 11 is rotated with an inserted coin, the same passes the connecting plate 16' and displaces feeler member 16 an angle which is proportionate to the diameter of the coin held in a recess of drum 11. FIG. 2 shows in chain lines a 5 DM piece engaging the feeler member and displacing the same so that projection 18 moves to the left in the direction of the arrow to displace actuating member 19 to the left as viewed in FIGS. 1 and 2. It is evident that, if a coin having a smaller diameter is held by the coin holding drum 11, feeler member 16, 18 will be turned a smaller angle, and consequently displace actuating member 19 a shorter distance.

When drum 11 has turned 180° out of its normal position of rest shown in FIG. 3, the sensed coin drops into a receptacle 20. Three coins of different value are shown in this position in FIG. 2.

Coin receptacle 20 is located behind an opening in casing 1 closed by a cover plate 21 which can be locked by a lock 23 and key 22 so that only an authorized person can remove the receptacle 20 with the accumulated coins.

A printing apparatus 24 is also located behind the opening and cover 21, but cover 21 is provided with an opening through which a manually operable knob 25 of the printing apparatus projects to the outside, and which also permits the discharge of a paper band 29 on which the received amount of money is printed by the printing apparatus 24.

A long angular lever 26 is mounted on a shaft 27, and has one end engaged by the manually operated valve and discharge nozzle 28 when the same is supported on the casing 1. When gasoline is dispensed, nozzle 28 is removed from the casing and inserted into the gas tank so that gasoline is discharged through the hose connected with discharge nozzle 28. A spring 26' acts on lever 26 to turn the same out of its normal position of rest to the operative position illustrated in chain lines when the discharge nozzle 28 is used, and in the displaced position of lever 26, member 46 which is pivotally connected with lever 26 is moved down to effect clearing of the printing apparatus as will be described with reference to FIG. 5a.

As a result, every time when a new dispensing operation is started by removal of the discharge nozzle 28 from casing 1, the printing apparatus 24 is automatically cleared so that it can be accurately set to a position representing the price of the gasoline discharged during the following dispensing operation.

The printing apparatus which is controlled by the device 10 shown in FIGS. 2 and 3, will now be described with reference to FIGS. 4, 5, 5a and 5b. The casing 31 of the printing apparatus envelopes two printing rollers 32 mounted on a shaft 33 and printing the month and the year. The price is printed by a printing roller 34 which is also mounted on shaft 33. The printing roller 34 can be turned between a plurality of printing positions in which different printing faces representing different digits are in a printing position. The turning of the printing means 34 is effected by a pawl 36 having a projecting portion 44, see also FIG. 5b, which cooperates with a ratchet wheel 35 secured to printing roller 34. Pawl 36 is mounted on a pin carried by actuating member 19 which is shifted different distances by projection 18 of feeler member 16 when dfferent coins are sensed by the same. FIG. 5 illustrates three displaced positions of actuating member 19 assumed under the control of sensed coins having different diameters, such as 1, 2 or 5 DM.

A spring 38 is attached to actuating member 19, and to a fixed pin 39 and urges actuating member 19 to move to the left as viewed in FIG. 5 until a stop pin 41 is in engagement with the end of a slot 40 in actuating member 19. The other end of actuating member 19 is guided along a support 42 so that slot 40 and support 42 cause a straight movement of actuating member 19 when the same is dispaced by feeler member 16.

As best seen in FIG. 5b, pawl 36 has not only the projection 44 which cooperates with ratchet wheel 35, but also an angular projection 45 engaged by a projecting portion 46' of member 46 which is controlled by the angular lever 26, as explained with reference to FIG. 1. When the discharge nozzle 28 is removed from casing 1, lever 46 is in the position of FIG. 5a. A spring 48 is connected to lever 46 and urges the same to turn in counterclockwise direction about a pivot 47, but the force of spring 48 is overcome by the stronger force of spring 26' acting on lever 26 when the same is released by discharge nozzle 28.

In the position of FIG. 5, pawl 36 is turned by a spring 43 on pin 37, to turn to a position engaging ratchet wheel 35. When actuating member is shifted in this position to the right as viewed in FIG. 5, projection 44 slides over the teeth of ratchet wheel 35, and when the sensed coin releases feeler member 16, spring 38 retracts actuating member 19 so that ratchet wheel 35 is turned with printing wheel 34 in clockwise direction to a printing position representing the sensed coin.

Figures 5, 5B:
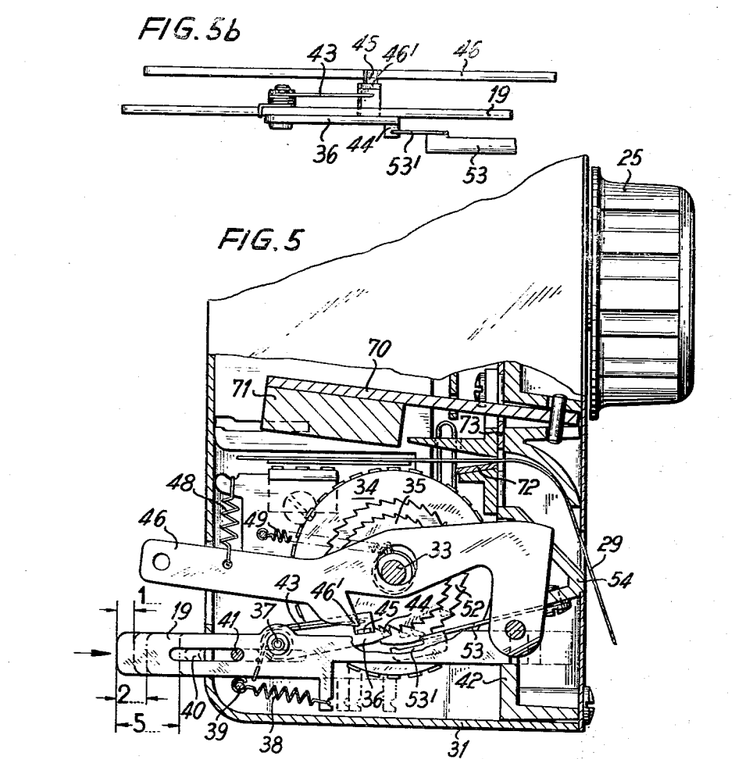
FIG. 5 is a sectional view of the printing apparatus of FIG. 4 as viewed from the other side.
FIG. 5b is a plan view illustrating parts of the printing apparatus shown in FIG. 5.
Figure 5A:
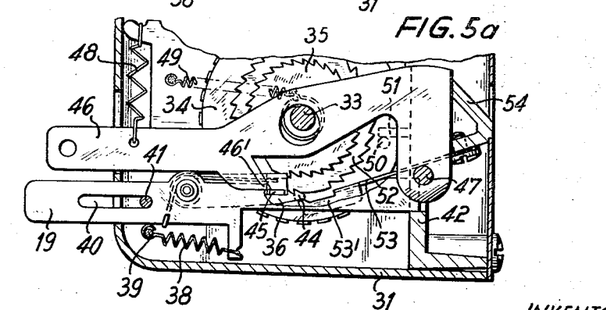
FIG. 5a is a sectional view showing a detail of FIG. 5 in another operational position.

If lever 46 is in the position of FIG. 5a due to the removal of the discharge nozzle 28, pawl 36 with projection 44 no longer engages ratchet wheel 35 so that a spring 49 connected to the printing wheel 34 urges the same to turn in counterclockwise direction to an initial position of rest in which a stop 50 on printing wheel 34 abuts a fixed stop 51, as shown in FIG. 5a.

A second ratchet wheel 52 is also secured to printing roller 34, and cooperates with an arresting pawl in the form of a leaf spring 53 which is secured to a fixed housing portion 54. When lever 46 is turned to the position of FIG. 5a, pawl 44 is not only moved out of engagement with the teeth of ratchet wheel 35, but also into engagement with a projecting portion 53' of pawl 53 so that the latter releases ratchet wheel 52, permitting spring 49 to turn the printing wheel 34 to the position of rest.

While pawl 36, 44 slides on the teeth of ratchet wheel 35 during movement of actuating member 19 to the right as viewed in FIG. 5, arresting pawl 53 prevents rotation of printing wheel 34 in counterclockwise direction by spring 49.

The parts of the printing apparatus by which the imprints on a receipt are produced, are known and not an object of the invention. A paper tape roll 30 is mounted on the shaft of a paper holder 55 which is attached to the housing. The paper tape is guided over a guide roll 56 and passes between a transporting roller 57 and a pressure roller 58 into the region of price printing roller 34 and date printing roller 32. A fixed printing means 60 may be provided for printing constant data.

When knob 25 is manually turned, a shaft 61 drives transporting roller 57 over a gear train including bevel gears 62, 63, and spur gears 64, 65, 66. Each revolution of knob 25 and shaft 61, corresponds to a movement of the tape 29 during which a portion of the tape corresponding to one receipt is discharged through an opening 59 in the casing of the printing apparatus, and also out of casing 1 of the gas pump column. Shaft 61 carries a cam 67 which drives over cam followers 2 slides 68, 69.

Figure 4:
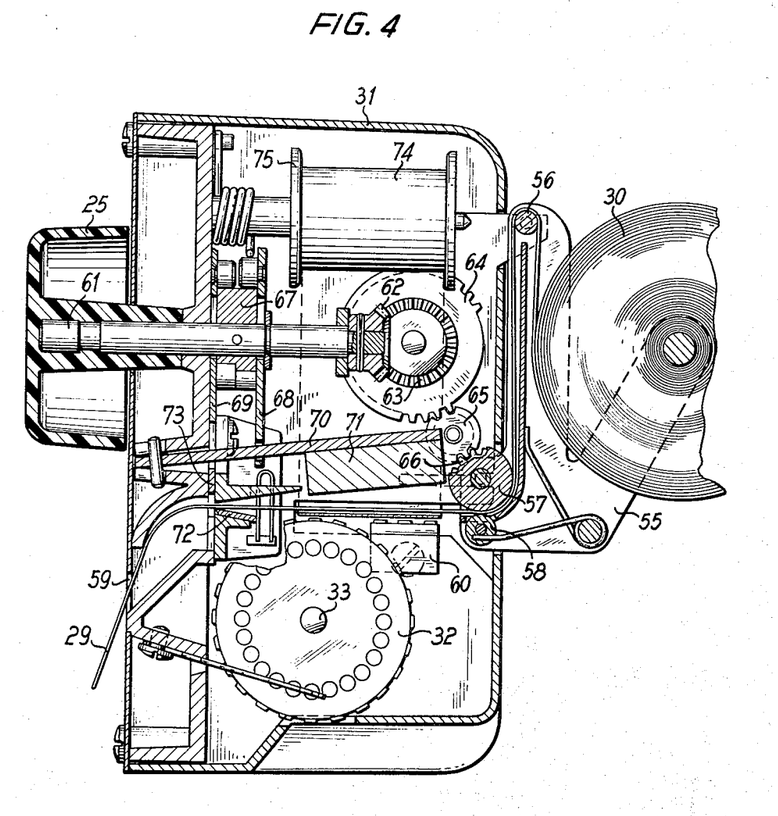
FIG. 4 is a sectional view of a printing apparatus as viewed from one side.

Slide 68 turns a lever 70 carrying a printing member 71 which presses the tape against an inked ribbon 74 which is supplied from a reel 75, so that a section of the paper tape and the ribbon are pressed against the type faces of printing rollers 34 and 32, as best seen in FIG. 4. At the same time, printing means 60 effect the printing of repeated constant datas on the respective section of the paper tape. Slide 69 operates a cutting means including a fixed knife 72 and a knife 73 mounted on slide 69 so that a section of the paper tape corresponding to a receipt is cut off after the printed section has been moved further by the transporting roller 57 to a position located partly outside of the casings.

When the smallest coin is inserted into the holding device 11, and the same is turned by a handle on shaft 15, not shown, feeler lever 16 is displaced a small angular distance, and shifts actuating member 19 from the position illustrated in solid lines to the first position illustrated in broken lines in FIG. 5 so that projection 44 of pawl 36 moves over one tooth of ratchet wheel 34 without displacing the same since ratchet wheel 34 is held by spring 49 in a position of rest in which stop 50 abuts stop 51. When the coin releases feeler member 16, spring 38 moves actuating member 19 back to its initial position, and during such movement, projection 44 of pawl 36 turns ratchet wheel 35 together with printing wheel 34 in clockwise direction one step to a printing position in which a type face representing the value of the smallest coin, for example 1 DM, is located in a printing position opposite printing member 71.

In the event that the inserted coin sensed by feeler member 16 is either a 2 DM or a 5 DM piece, pawl 36, 44 moves over two or five teeth of ratchet wheel 35 before engaging the same, and when actuating member 19 is retracted by spring 38, the printing means is turned corresponding angular distances to printing positions representing 2 or 5 DM. Successively inserted and sensed coins will cause successive turning movements of the printing wheel 34 so that the same will finally assume a printing position representing the total value of all inserted and sensed coins, and when this is the case, knob 25 is manually turned to effect printing of the amount represented by printing wheel 34, and cutting off of the printed section of tape 29 which constitutes a receipt.

It will be understood that a number of axially aligned printing wheels 34 are provided which are respectively associated with different orders, and such printing wheels are connected by conventional tens transfer devices, while only the unit printing wheel is operated by ratchet wheel 35 and pawl 36, 44.

It is evident that the coin controlled printer of the present invention permits the setting of printing means to different printing positions representing the total value of the inserted coins, irrespective of the denomination and the sequence of the inserted coins.

From the above description of one embodiment of the invention, it will become apparent that sensing means in the form of feeler member 16 sense coins held by coin holding device 11, and that the sensing means 16 assume different sensing positions representing different sensed coins. Drive means, including shaft 15, and a handle, not shown, are used for turning the coin holding device 11 relative to the sensing device including feeler member 16. Sensing device or feeler member 16 control through projection 18, the actuating member 19 of the actuating means 19, 36, 44, 35 by which printing means 34 is stepwise turned. Manual operating means including knob 25 is operated to first effect printing of the total monetary value of the inserted coins on a blank receipt section of tape 29 by operation of printing member 71, and to then effect shifting of tape 29 so that the imprinted receipt is discharged through opening 59. Clearing means including clearing lever 46 and spring 49 are provided for clearing the printing means after a printing operation by releasing pawl 36, 44 and arresting pawl 53.

A second embodiment of the invention is illustrated in FIGS. 6 to 9. The casing 1 of a gas pump column contains the calculator 2 with indicating means for the dispensed volume of gasoline, and for the price of the sold gasoline. The discharge nozzle is operable as described with reference to the embodiment of FIGS. 1 and 2, and opens in the illustrated position of rest, a switch 80 which is part of the clearing means by which the printer is cleared.

Figure 7:
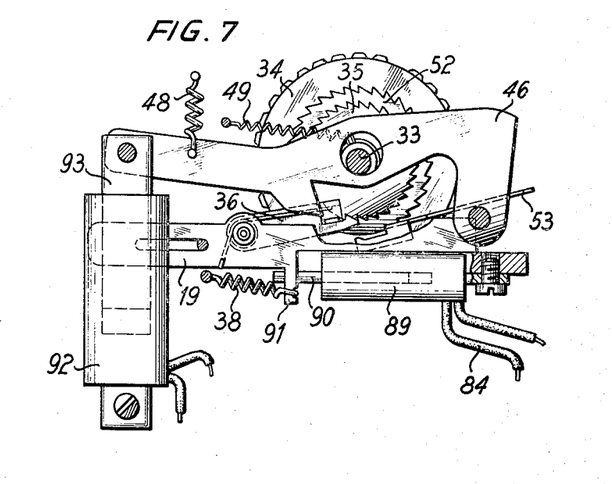
FIG. 7 is an elevation illustrating a detail of the printing apparatus used in the embodiment of FIG. 6.

A second casing 81 contains the coin controlled printer, as schematically illustrated. A coin testing device 3 rejects improper coins, and permits certain coins, such as 1, 2 and 5 DM pieces to pass through guide means 9 into corresponding axially aligned recesses of the rotary coin holding device 10. After turning of the coin holding drum 11 through 180°, the respective coins are discharged into a receptacle 21, the construction of the coin holding drum 11 being the same as shown in FIG. 3. A printing apparatus 24' is also mounted in casing 81, and is constructed in the same manner as the printing apparatus of FIGS. 4 and 5 with the exception of certain parts which are illustrated in FIG. 7. The coins turning with holding device 11 are not mechanically, but electrically sensed. An electric sensing device 82 is provided for this purpose and shown in detail in FIGS. 8 and 9. Corresponding to the three axially aligned recesses 12, 13, 14 in the rotary coin holding device 11, see FIG. 3, three switch actuators are provided, each switch actuator being constituted by control members 88a, 88b, 88c.

Figure 8:
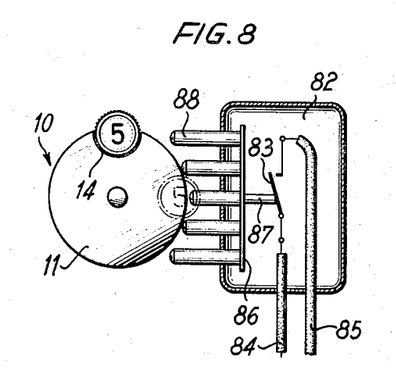
FIG. 8 is a fragmentary front view illustrating a detail of the sensing device of the embodiment of FIG. 6.
Figure 9:
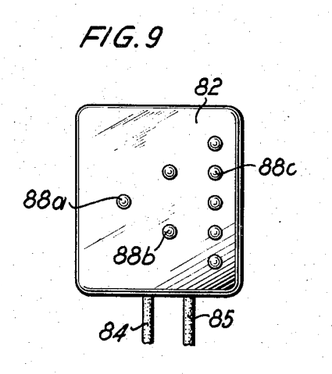
FIG. 9 is a side elevation illustrating the device shown in FIG. 8.

A single control member 88a is located opposite the path of movement of recess 12 for the 1 DM coin, two control members 88b are located opposite the path of movement of recess 13 for the 2 DM coin, and five control members 88c are located opposite the path of movement of recess 14 for the 5 DM coin. All control members are mounted on a switch plate 86 which is connected by a link 87 to a switch 83 which, when closed, connects two conductors 84, 85.

Conductors 84, 85 are connected to the terminals of an electromagnetic actuator means 89 whose armature 90 is connected with a projection of actuator member 19, as shown in FIG. 7, and also to a voltage source.

When a 1 DM piece is turned with coin holding drum 11 by a manual operation, or by a motor, the respective small coin passes the single control member 88 and depresses the same together with switch plate 86 to close switch 83 so that electromagnetic means 89 is energized and moves its armature 90 to a position for displacing actuating member 19 to the right as viewed in FIG. 7 so that pawl 36 slides over the teeth of ratchet wheel 35 which is held in a position of rest by spring 49, as explained with reference to FIG. 5. When the coin in holding device 11 passes control member 88a, the same returns to its normal position, and electromagnetic means 89 is deenergized so that spring 38 pulls actuating member 19 to the left as viewed in FIG. 7 and pawl 36 turns ratchet wheel 35 one step in clockwise direction together with the printing wheel 35 which assumes a printing position for printing the value 1 DM corresponding to the sensed coin.

When a 2 DM coin is inserted into the corresponding recess 13, and coin holding device 11 rotated the coin actuates successively two control member 88b so that electromagnetic means 89 is twice energized, and shifts actuating member 19 with pawl 36 twice so that ratchet wheel 35 is turned two steps in clockwise direction and the printing wheel represents the value 2 DM.

When a 5 DM coin is inserted, five control members 88c are successively engaged and operated to close switch 83 so that electromagnetic means 89 is five times energized, and ratchet pawl 36 is shifted by armature 90 and actuating member 19 five times to effect displacement of the printing means through five angular steps so that the same assume a printing position representing 5 DM, or, if the printing wheel 34 is already in a printing position representing a monetary value, it is turned five steps to indicate a monetary value which is 5 DM higher.

As in the embodiment of FIG. 5, the arresting pawl 53 prevents a turning of the printing wheel by spring 49 while pawl 36 moves along the backs of the ratchet teeth of ratchet wheel 35. Clearing lever 46, which is normally held in an inoperative position by spring 48, can be turned to a clearing position in which it lifts pawl 36 out of the recesses of ratchet wheel 35, whereupon pawl 36 engages arresting pawl 53 and moves the same away from the teeth of ratchet wheel 52, as described with reference to FIG. 5.

Figure 6:
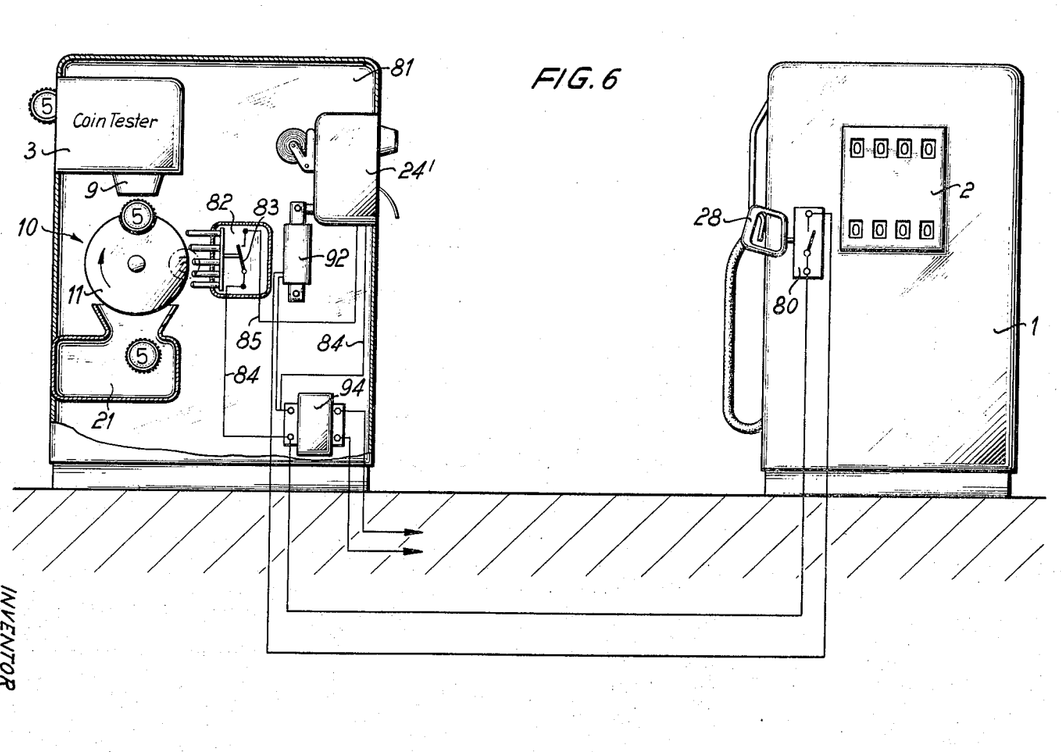
FIG. 6 is a front view, partially in schematic section, illustrating a gas pump and a coin controlled printer in accordance with another embodiment of the invention.

Clearing lever 46 is operated by an electromagnetic clearing means 92 which is connected over a transformer 94 to clearing switch 80 shown in FIG. 6. Conductors 84, 85 and switch 83 are also located in the circuit of transformer 94 which receives an alternating voltage from a voltage source.

When discharge nozzle 28 is removed from its rest on the casing 1 of the gas pump, switch 80 closes and clearing magnet 92 is energized to move the clearing lever 46 to the clearing position in which the printing means are turned by spring 49 back to its initial position.

It will be understood that switch actuators 88a, 88b, 88c, 86, 87 and switch 83 constitute a sensing device cooperating with a coin holding device and assuming different sensing positions depending on the sensed coin. The sensing means provide impulses for the actuating means 89, 19, 36, 34 by which the printing means are moved between printing positions. Clearing means are provided in the form of clearing magnet 92 and clearing lever 46.

It will be understood that each of the elements described above, or two or more together, may also find a useful application in other types of coin controlled apparatus differing from the types described above.

While the invention has been illustrated and described as embodied in a coin controlled printer for printing receipts for coins inserted into a gas pump, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Coin controlled printer for use in a coin controlled fuel dispensing apparatus, comprising, in combination printing means movable to successive printing positions representing monetary values; actuating means for stepwise operating said printing means; a coin holding device for receiving and holding different coins; a sensing device for sensing coins held by said coin holding device; drive means for moving one of said devices relative to the other device so that said sensing device senses a coin held in said coin holding device and represents the value of the sensed coin, said sensing device controlling said actuating means to move said printing means different numbers of steps representing the values of different sensed coins so that said printing means is set to a printing position representing the total value of coins successively sensed by said sensing deice; supply means for supplying blanks to said printing means; operating means for operating said printing means to print said total value on a blank, and for then discharging the imprinted blank as a receipt for the total monetary value of the received coins; and clearing means for clearing said printing means.

2. Coin controlled printer according to claim 1, wherein said coin holding device has a plurality of recesses shaped for holding coins having different diameters, and is turnable by said operating means; and wherein said sensing device includes a feeler member mounted for angular movement and being engaged and displaced to different sensing positions by coins in said holding device having different diameters.

3. Coin controlled printer according to claim 1, wherein said coin holding device has a plurality of recesses shaped for holding coins having different diameters, said coin holding device being turnable by said operating means; wherein said sensing means includes a switch means, and a plurality of switch actuator means respectively operated by coins held in said recesses to assume different sensing positions for actuating said switch means different numbers of times respectively representing the values of different coins; and wherein said actuating means include electromagnetic means connected into the circuit of said switch means and being energized the same different numbers of times respectively related to different coins, said electromagnetic means having an armature for stepwise operating said printing means.

4. Coin controlled printer according to claim 1, wherein said coin holding device is a rotary holding member having a plurality of axially aligned recesses formed to receive and hold coins of different diameter; and comprising a means having a plurality of slots and a plurality of guide means respectively connecting said slots with said recesses in a position of rest of said rotary holding member; and wherein said drive means includes a shaft connected with said holding member for turning the same past said sensing device so that the same senses a coin in any one of said recesses.

5. A coin controlled printer according to claim 1, wherein said printing means include at least one printing wheel turnable between a plurality of printing positions; and wherein said actuating means includes a ratchet wheel connected with said printing wheel for turning movement, and pawl means cooperating with said ratchet wheel for turning said printing wheel, said pawl means being operatively connected with said sensing device to be displaced by the same in accordance with the value of the sensed coin whereby said printing wheel is turned to a corresponding printing position an angular distance representing the sensed coin.

6. A coin controlled printer according to claim 5, and including arresting means cooperating with ratchet wheel means for arresting the same and said printing wheel in said printing positions; and wherein said clearing means includes means for moving said pawl means and said arresting means out of engagement with said ratchet wheel means, and means biasing said printing wheel to turn to a position of rest when said pawl means and arresting means release said ratchet wheel means.

7. A coin controlled printer according to claim 1 wherein said coin holding device is a rotary holding member having a plurality of axially aligned recesses formed to receive and hold coins of different diameters; and comprising a means having a plurality of slots and a plurality of guide means respectively connecting said slots with said recesses in a position of rest of said rotary holding member; wherein said operating means includes a shaft connected with said holding member for turning the same past said sensing device so that the same senses a coin in any one of said recesses; and wherein said sensing means includes a switch means and a plurality of axially aligned switch actuators respectively operated by different coins held in said recesses of said coin holding device to actuate said switch means different numbers of times when different switch actuators are operated; wherein said actuating means include electromagnetic means connected to said switch means and energized by the same, said electromagnetic means having an armature for stepwise shifting said printing means different numbers of times corresponding to the diameter of the sensed coin.

8. A coin controlled printer according to claim 7 and wherein said clearing means include a clearing magnet, and a clearing member operated by said clearing magnet to disconnect said armature from said printing means, and means biasing said printing means to move to a cleared position.

9. A coin controlled printer according to claim 1, wherein said sensing device includes a switch means, and a series of switch actuators respectively operated by different coins; each of said switch actuators including a different number of aligned control members operable by coins in said holding means to actuate said switch means different numbers of times; and wherein said actuating means include an electromagnetic means connected into the circuit of said switch means so as to be energized different numbers of times in accordance with the sensed coin, said electromagnetic means including a movable armature connected with said printing means for stepwise moving the same to a printing position representing the value of the sensed coin.

10. A coin controlled printer according to claim 9, wherein said coin holding device includes a turnable drum having a series of axially aligned recesses shaped to partly receive and hold coins having different diameters, said recesses being respectively located opposite said switch actuators, and said drum being turned by said operating means so that different groups of aligned control members are actuated by different coins held by said holding means.

11. Coin controlled printer as claimed in claim 1 in combination with fuel dispensing means having control means controlled by said sensing device to operate said fuel dispensing means to dispense a commensurate amount of fuel, and a discharge nozzle for discharging the dispensed fuel having a position of rest and a discharging position, said discharge nozzle in said discharging position operating said clearing means whereby said printing means is cleared before discharge of an amount of fuel bought by coins received by said coin holding device whereby the value of the coins is printed on the receipt.

12. Coin controlled printer as claimed in claim 1 wherein said operating means are manually operated.

References Cited
UNITED STATES PATENTS

| | | |
|---|---|---|
| 2,236,198 | 3/1941 | Osborne. |
| 2,706,550 | 4/1955 | Gray. |
| 2,724,478 | 11/1955 | Shaheen et al. |
| 2,995,229 | 8/1961 | West. |

SAMUEL F. COLEMAN, *Primary Examiner.*